United States Patent [19]
Henseler

[11] Patent Number: 5,437,473
[45] Date of Patent: Aug. 1, 1995

[54] AIR INDUCTION AIRBAG-COLLISION-PROTECTION SYSTEM FOR A MOTOR CAR

[75] Inventor: Wolfgang Henseler, Tübingen, Germany

[73] Assignee: Mercedes Benz AG, Stuttgart, Germany

[21] Appl. No.: 112,329

[22] Filed: Aug. 27, 1993

[30] Foreign Application Priority Data

Aug. 28, 1992 [DE] Germany .................. 42 28 617.4

[51] Int. Cl.⁶ .................................... B60R 21/30
[52] U.S. Cl. ............................................ 280/738
[58] Field of Search .......... 280/738, 732, 728 R, 280/731

[56] References Cited

U.S. PATENT DOCUMENTS 3,840,246 10/1974 McCullough, Jr. et al. ........ 280/738
3,909,037  9/1975 Stewart .............................. 280/738
4,928,991  5/1990 Thorn ................................ 280/738

FOREIGN PATENT DOCUMENTS 1297032 11/1972 United Kingdom .

Primary Examiner—Eric D. Culbreth
Attorney, Agent, or Firm—Evenson McKeown Edwards & Lenahan

[57] ABSTRACT

An air-induction gasbag-collision-protection system for a motor car is disclosed which has a receiving housing into which a gasbag casing which is fastened to the receiving housing and is open towards the housing is folded. A gas source is provided in the receiving housing for the filling of the gasbag casing and for its unfolding in the expanded state. The receiving housing exhibits apertures in a housing wall of the receiving housing, by which apertures an intake of air surrounding the receiving housing into the receiving housing and the gasbag casing is made possible. The cross-sections of the apertures are covered by intake flaps, which can be opened by the underpressure generated in the unfolding of the gasbag casing and by virtue of which an escape of internal gases from the receiving housing through the apertures is prevented. Each intake flap is cut into the housing wall as part of the receiving housing and is pivotable about a lateral edge remaining on the receiving housing in the direction of the housing interior.

12 Claims, 2 Drawing Sheets

5,437,473

AIR INDUCTION AIRBAG-COLLISION-PROTECTION SYSTEM FOR A MOTOR CAR

BACKGROUND AND SUMMARY OF THE INVENTION

The invention relates to an air-induction gasbag-collision-protection system comprising:

a receiving housing, a gasbag casing which is fastened to the receiving housing and is open towards the housing said gasbag casing being folded and disposed in the receiving housing when in an unexpanded state, and a gas source in the receiving housing for the filling of the gasbag casing and for its unfolding to an expanded state, an intake of air surrounding the receiving housing into the receiving housing and the gasbag casing being facilitated by apertures in a housing wall of the receiving housing, the cross-sections of which apertures are covered by intake flaps, which intake flaps can be opened by underpressure generated in the unfolding of the gasbag casing and by virtue of which an escape of internal gases from the receiving housing through the apertures is prevented.

From European Patent Document EP-A 0 386 365, an aspirator-gasbag (airbag) system is known in which flutter valves, as they are termed, are placed in front of the apertures in the receiving housing and are secured by holders, which flutter valves allow the intake of external air and prevent the escape of gas from the receiving housing, in the opposite direction. The additional flutter valves must be produced as separate parts and fitted to the receiving housing, which, for a gasbag-collision-protection system which is usually only used once and is then completely replaced, leads to an uneconomic increase in, the cost of the protective device.

An object of the invention is to reduce the manufacturing costs of a gasbag-collision-protection system of the generic type.

The object is achieved by providing a system wherein each intake flap is cut into the housing wall as part of the receiving housing and is pivotable in the direction of the housing interior about a lateral edge remaining on the receiving housing.

By virtue of the intake flaps being cut into the housing wall as part of the receiving housing, into the housing wall and being pivotable about a lateral edge remaining on the receiving housing, in the direction of the interior of the housing, an easily realized facility is discovered for adding ambient air from the passenger compartment to the gases for the unfolding of the gasbag, which ambient air pyrotechnically reduces the volume of gas to be generated and thereby reduces the rise in pressure in the passenger compartment as the gasbag is inflated. A complicated valve construction is not necessary for this, since the intake flaps only swivel inwards once the underpressure resulting from the unfolding of the gasbag is sufficiently great.

In order to prevent an escape of gases as the gas source is opened and the therewith associated gas propulsion, on the one hand the material resistance in the swivel axes of the intake flaps can be configured according to requirements by the shape design adopted at this spot and, in addition, the cut edges of the intake flaps can be provided with a slant, by virtue of which the border of the intake flap covers, from the housing interior, the oblique aperture border in the receiving housing, thereby preventing an outward swivel motion.

It may further be provided according to certain preferred embodiments of the invention to dispose a screening plate between a pipe gas generator as the gas source and the intake flaps in the receiving housing, which screening plate prevents the intake flaps from being directly pressurized by gas flowing out of the pipe gas generator. A linear thickening or thinning of the receiving housing in the region of the swivel axis to be formed is particularly simple to realize in the case of a synthetic receiving housing, where these cross-sectional changes to the housing wall can be constructed without any great effort. The possibility of different times of opening and/or opening speeds, matched to the circumstances prevailing in the unfolding, is thus provided for the various intake flaps.

Other objects, advantages and novel features of the present invention will become apparent from the following detailed description of the invention when considered in conjunction with the accompanying drawings.

DETAILED DESCRIPTION OF THE DRAWINGS

Figure 1:
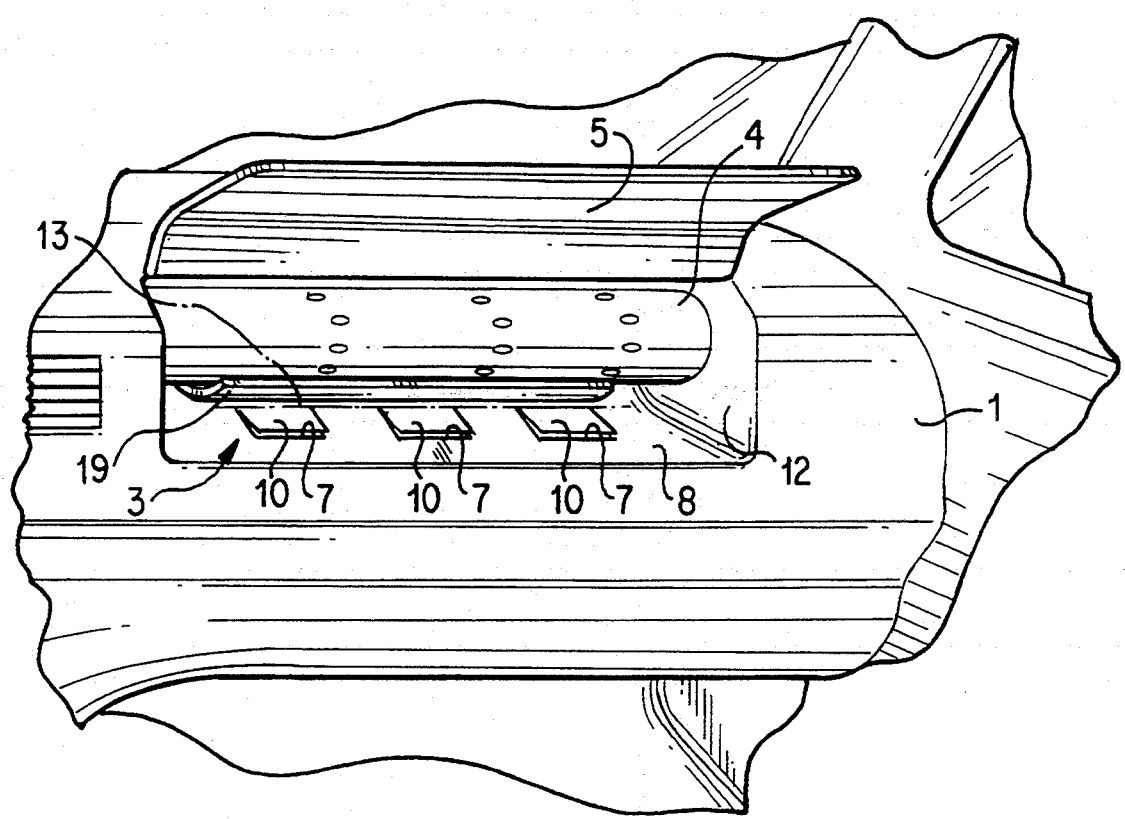
FIG. 1 is a schematic partial oblique view of a receiving housing for a gasbag-collision-protection system having an activated pipe gas generator and air-intake flaps in the open state (the unfolding gasbag casing not being represented), constructed according to a preferred embodiment of the invention.

In FIG. 1, an instrument panel 1 in a motor vehicle is represented. A gasbag-collision-protection system 3 is inserted on the passenger side into the panel 1 in a receiving housing 2. The receiving housing 2 is represented showing a condition following the triggering of a pipe gas generator 4 serving as the gas source, with an open housing cover 5 but, for reasons of clarity, without an unfolded gasbag casing 6. This particular gasbag-collision-protection system 3 is an air-induction aspirator-gasbag system, as it is termed, in which, during the unfolding of the gasbag casing 6, ambient air surrounding the receiving housing 2 is sucked in through one or more apertures 7 in a housing wall 8 of the receiving housing 2 by virtue of the underpressure generated during the unfolding, which ambient air assists the filling of the gasbag casing 6. For this purpose, the gasbag casing 6 must be fastened by the mouth 9 of its aperture to the receiving housing 2 in a sealed manner, in such a way that it leaves the apertures 7 free.

Figure 2:
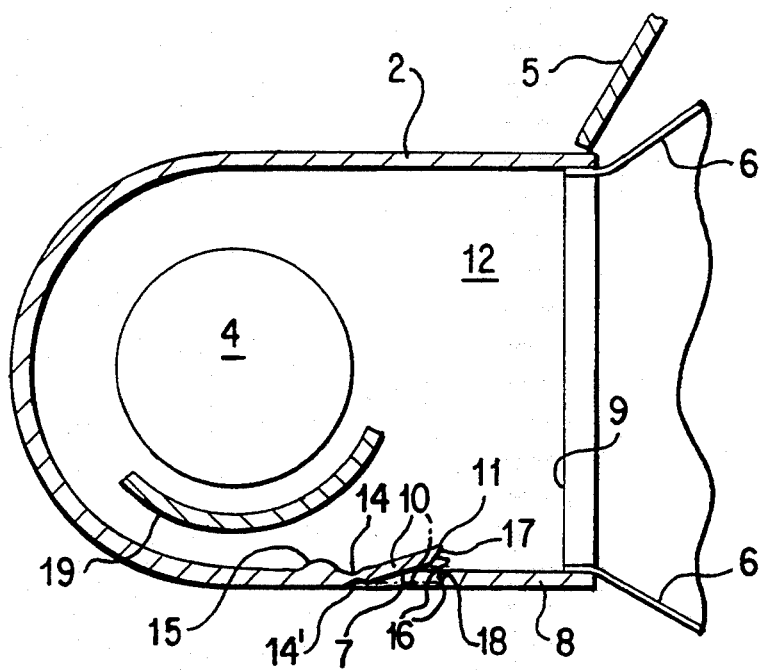
FIG. 2 is a cross-sectional view through the arrangement according to FIG. 1 and through an intake flap, having a closed intake flap drawn in dash-dotted representation.

The cross-section of the apertures 7 is covered by a respective intake flap 10, which is to be opened by the underpressure generated in the unfolding of the gasbag casing 6, but which prevents an escape of internal gases from the receiving housing 2 through the apertures 7. The intake flaps 10 are cut, as part of the receiving housing 2, into the housing wall 8 and are attached so as to be pivotable about a lateral edge 14 remaining on the receiving housing 2 in the direction of the housing interior 12. A swivel axis 13 is formed, as represented in FIG. 2, by a linear thinning 14, 14', which can be provided externally or internally, and by an adjacent linear thickening 15 on the housing wall 8. In the case of a synthetic receiving housing 2, this can already be realized particularly easily in the production of the housing. An intake flap 10 is here represented in a position which is open during the filling of the gasbag casing 6, by virtue of the underpressure in the receiving housing 2, and is drawn in dash-dotted representation, prior to commencement of the unfolding, in a position covering the aperture 7.

Figure 2A:
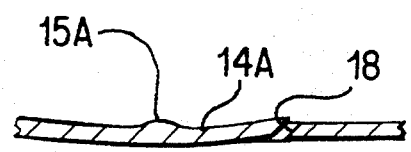
FIG. 2A is a partial view showing showing a first embodiment of an intake flap at its connection at the adjacent housing wall.
Figure 2B:
FIG. 2B is a partial view showing a second embodiment of an intake flap at its connection at the adjacent housing wall.

FIGS. 2A and 2B schematically depict different relative thickness of the thickening line 15A, 15B and the thinning line 14A, 14B, whereby the intake flaps can be configured to exhibit different times of opening and/or opening speeds by variation of the swivel-axis configuration.

By a purposeful configuration of the swivel axes 13, the commencement of opening and/or the opening speeds of the individual intake flaps 10 can be influenced and can be varied independently of one another. In order effectively to prevent an escape of gas from the housing interior 12, each intake flap 10 exhibits in this illustrative embodiment, in the receiving housing 2, a cut face 16 on at least one side, which cut face runs obliquely to the cross-section of the housing wall 8, an intake flap border 17 covering, from the housing interior 12, an oblique aperture border 18 and thereby preventing an outward opening motion of the intake flap 10 as the pipe gas generator 4 is ignited. In order to improve still further this protection against the escape of gas, a screening plate 19 is disposed between the intake flaps 10 and the pipe gas generator 4, which screening plate keeps the gas expulsion from the pipe gas generator 4 away from the intake flaps 10.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Air-induction airbag-collision-protection system for a motor car, comprising:
    a receiving housing,
    a gasbag casing which is fastened to the receiving housing and is open towards the housing, said gasbag casing being folded and disposed in the receiving housing when in an unexpanded state, and
    a gas source in the receiving housing for the filling of the gasbag casing and for its unfolding to an expanded state, an intake of air surrounding the receiving housing into the receiving housing and the gasbag casing being facilitated by apertures in a housing wall of the receiving housing, the cross-sections of which apertures are covered by intake flaps, which intake-flaps can be opened by underpressure generated in the unfolding of the gasbag casing and by virtue of which an escape of internal gasses from the receiving housing through the apertures is prevented,
    wherein each intake flap is formed by cutting into the housing wall and is pivotable in a direction of the housing interior about a lateral pivot edge remaining on the housing wall, and
    wherein the intake flaps open about a swivel-axis which is formed by a hinged section in the housing wall at the lateral pivot edge, which hinged section has a different thickness than adjacent sections of the housing wall.

2. Air-induction airbag-collision-protection system according to claim 1, wherein the receiving housing is made from synthetic material.

3. Air-induction airbag-collision-protection system according to claim 1, wherein the intake flaps exhibit at least one of different times of opening and opening speeds by variation of the swivel-axis configuration.

4. Air-induction airbag-collision-protection system according to claim 1, comprising a screening plate for screening discharge of gas from a pipe gas generator of the gas source in the direction of the intake flaps.

5. Air-induction airbag-collision-protection system according to claim 1, wherein each intake flap exhibits a cut face at a cut face edge disposed at a side of the intake flap opposite the lateral pivot edge, said cut face extending obliquely to a cross-section of an adjacent housing wall section to thereby form a one-way flap valve opening to the interior of the receiving housing.

6. Air-induction airbag-collision-protection system according to claim 1, wherein said hinged section includes a thinning line and an adjacent thickening line in the housing wall.

7. Air-induction airbag-collision-protection system according to claim 6, wherein each intake flap exhibits a cut face at a cut face edge disposed at a side of the intake flap opposite the lateral pivot edge, said cut face extending obliquely to a cross-section of an adjacent housing wall section to thereby form a one-way flap valve opening to the interior of the receiving housing.

8. Air-induction airbag-collision-protection system according to claim 7, comprising a screening plate for screening discharge of gas from a pipe gas generator of the gas source in the direction of the intake flaps.

9. Air-induction airbag-collision-protection system for a motor car, comprising:
    a receiving housing,
    a gasbag casing which is fastened to the receiving housing and is open towards the housing, said gasbag casing being folded and disposed in the receiving housing when in an unexpanded state, and
    a gas source in the receiving housing for the filling of the gasbag casing and for its unfolding to an expanded state, an intake of air surrounding the receiving housing into the receiving housing and the gasbag casing being facilitated by apertures in a housing wall of the receiving housing, the cross-sections of which apertures are covered by intake flaps, which intake-flaps can be opened by underpressure generated in the unfolding of the gasbag casing and by virtue of which an escape of internal gasses from the receiving housing through the apertures is prevented,
    wherein each intake flap is formed by cutting into the housing wall and is pivotable in a direction of the housing interior about a lateral pivot edge remaining on the housing wall, and
    wherein each intake flap exhibits a cut face at a cut face edge disposed at a side of the intake flap opposite the lateral pivot edge, said cut face extending obliquely to a cross-section of an adjacent housing wall section to thereby form a one-way-flap valve opening to the interior of the receiving housing.

10. Air-induction gasbag-collision-protection system according to claim 9, wherein the receiving housing is made from synthetic material.

11. Air-induction gasbag-collision-protection system according to claim 9, the intake flaps exhibit at least one of different times of opening and opening speeds by variation of the swivel-axis configuration.

12. Air-induction gasbag-collision-protection system according to claim 9, comprising a screening plate for screening discharge of gas from a pipe gas generator of the gas source in the direction of the intake flaps.

* * * * *